United States Patent [19]

Schaeffer

[11] Patent Number: 5,476,919
[45] Date of Patent: Dec. 19, 1995

[54] PROCESS FOR ESTERIFICATION

[75] Inventor: Mark N. Schaeffer, Hudson, Wis.

[73] Assignee: Minnesota Mining and Manufacturing Company, St. Paul, Minn.

[21] Appl. No.: 391,205

[22] Filed: Feb. 21, 1995

[51] Int. Cl.$^6$ .................................................... C08G 63/02
[52] U.S. Cl. ...................... 528/272; 528/274; 528/298; 528/302; 528/307; 528/308; 528/308.6; 526/62; 526/64; 526/65; 526/67; 526/68
[58] Field of Search ........................ 528/272, 274, 528/298, 302, 307, 308, 308.6; 526/62, 64, 65, 67, 68

[56] References Cited

U.S. PATENT DOCUMENTS

| | | | |
|---|---|---|---|
| 3,167,531 | 1/1965 | Parker et al. | 526/65 |
| 3,509,203 | 4/1970 | Mechaelis et al. | 560/92 |
| 3,644,294 | 2/1972 | Siclari et al. | 526/59 |
| 4,154,920 | 5/1979 | Jabarin | 528/272 |
| 4,339,570 | 7/1982 | Muschelknautz et al. | 528/272 |
| 4,973,655 | 11/1990 | Pipper et al. | 528/272 |
| 5,064,935 | 11/1991 | Jackson et al. | 528/272 |

FOREIGN PATENT DOCUMENTS 237400 of 0000 Switzerland .

OTHER PUBLICATIONS

Kumar et al. "Optimization of the Transesterification Stage of Polyethylene Terephthalate Reactors" *Polymer Engineering and Science,* vol. 24 (No. 3), pp. 185–193, (Feb. 1984).
Patkar and Jabarin "Effect of Diethylene Glycol (DEG) on the Crystallization Behavior of Poly(ethylene terephthalate) (PET)," *Journal of Applied Polymer Science,* vol. 47, pp. 1749–1763 (1993).

*Primary Examiner*—Samuel A. Acquah
*Attorney, Agent, or Firm*—Gary L. Griswold; Walter N. Kirn; Robert H. Brink

[57] ABSTRACT

A method for the rapid esterification of dicarboxylic acids or the transesterification of lower alkyl carboxylic acid diesters with diols is disclosed. The method includes recycling of evaporated unreacted starting materials and can be carried out at elevated pressures. The resulting esterification or transesterification products can then be polymerized into polyesters, for example by a thin film polymerization method.

20 Claims, 2 Drawing Sheets

PROCESS FOR ESTERIFICATION

FIELD OF THE INVENTION

This invention relates to a process for the esterification of dicarboxylic acids or the transesterification of alkyl esters of dicarboxylic acids.

BACKGROUND OF THE INVENTION

Thermoplastic polymers such as poly(ethylene terephthalate) and poly(butylene terephthalate) are produced on a large scale in industry. To prepare these useful polymers, generally either the appropriate dicarboxylic acids are esterified directly with diols, or dicarboxylic esters, such as dimethyl terephthalate, are transesterified with diols. Such polymerization methods are well known. See, for example U.S. Pat. Nos. 4,339,570 (Muschelknautz et al.), 4,154,920 (Jabarin), 3,644,294 (Siclari et al.), and Swiss Patent Application 237,400.

Esterification of carboxylic acids and the transesterification of carboxylic acid esters are common and useful chemical reactions. Such reactions can be useful in the preparation of useful thermoplastic polyesters such as poly(ethylene terephthalate) and poly(butylene terephthalate). See, for example U.S. Pat. Nos. 5,064,935 (Jackson et al.), 4,973,655 (Pipper et al.), 3,509,203 (Mechaelis et al.), and 3,167,531 (Parker et al.).

Certain byproducts of esterification or transesterification are generally undesirable because of their effects on resulting polyesters. See, for example, Kumar, et al., "Optimization of the Transesterification Stage of Polyethylene Terephthalate Reactors," *Polymer Engineering and Science*, Vol. 24 (No. 3), pp. 185–193, (Feb. 1984), and Patkar and Jabarin, "Effect of Diethylene Glycol (DEG) on the Crystallization Behavior of Poly(ethylene terephthalate) (PET)," *Journal of Applied Polymer Science*, Vol. 47, pp. 1749–1763 (1993).

The Mechaelis et al. patent discloses a transesterification process comprising passing the mixture of reactants through narrow annular channels, the width of the channels with respect to their depth being smaller than 1.5:1 (see col. 3, lines 41–44). The working examples had a mean dwell time of from 200 to 240 minutes.

BRIEF SUMMARY OF THE INVENTION

Briefly, in one aspect, the present invention provides a process for the esterification of dicarboxylic acids or for the transesterification of dicarboxylic lower-alkyl esters, with at least one diol having two primary alcohol functionalities, e.g., ethylene glycol, comprising the steps of A) adding a liquid mixture comprising said acid or said ester, and said diol, to a substantially horizontal channel; B) allowing said liquid mixture to flow through said channel such that the ratio of the width of said channel to the depth of said liquid is greater than 1.5 to 1; C) heating said liquid mixture to a temperature sufficiently high to initiate esterification or transesterification and to drive off reaction byproducts, e.g., water or methanol, preferably at a sufficient rate such that the net forward reaction is not significantly reduced, and preferably sufficiently high to boil reaction byproducts such that said boiling provides some mixing; D) removing the water or lower-alkyl alcohol byproduct vapors from the channel such that such vapors have little further contact with said liquid mixture. Preferably, the method of this invention further comprises the steps of E) collecting unreacted diol, and preferably unreacted acid or ester, which has evaporated from the liquid mixture; and F) returning at least a portion, preferably most or all, of said collected diol, and preferably said collected acid or ester, to said channel at or near the beginning of said channel, preferably in the first 5%, or most preferably the first 1%, of the total length of the channel. Preferably, in the method of this invention, the ratio of the width of said channel to the depth of said liquid, and the speed of flow are such that the residence time of the components of said liquid mixture is relatively uniform, approximating "plug flow" rather than a wide range of residence times ("back mixed"). Preferably the depth of the liquid mixture in the channel is less than 13 cm, more preferably less than 5 cm, most preferably less than 4 cm. Particularly in the case of transesterification, the liquid mixture preferably further comprises a catalyst suitable for promoting or accelerating transesterification.

The method of this invention can provide at least 96% acid or ester conversion with average residence times of 30 minutes or less.

BRIEF SUMMARY OF THE DRAWINGS

These and other advantages will be discussed with reference to the accompanying drawings, in which.

DETAILED DESCRIPTION

Figure 1:
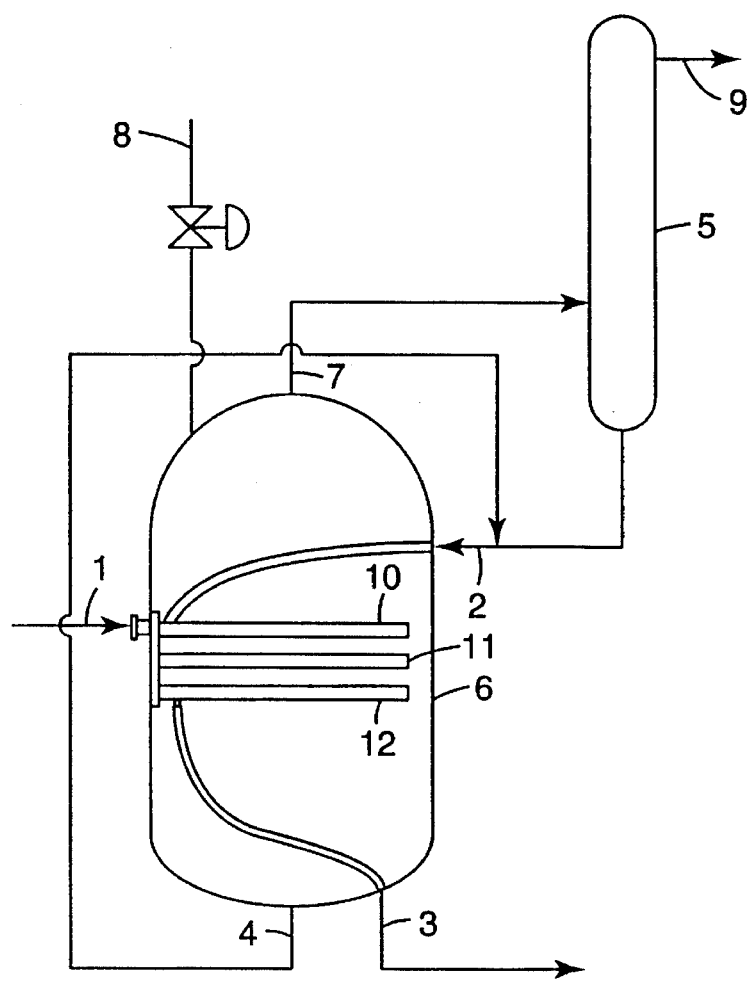
FIG. 1 shows a schematic representation of a first embodiment of apparatus suitable for practicing the method of this invention.

The dicarboxylic esters useful in this method are generally lower alkyl esters, preferably methyl or ethyl esters, of the acids useful in this invention. The acids useful in this invention include aliphatic or aromatic dicarboxylic acids having molecular weight of less than 400. Suitable aliphatic dicarboxylic acids include, for example, alkanedicarboxylic acids of 4 to 12 carbon atoms, in particular straight-chain dicarboxylic acids such as adipic acid, glutaric acid, azelaic acid or dodecanedoic acid. Suitable aromatic dicarboxylic acids include, for example, dicarboxylic acids having from 8 to 14 carbon atoms with the carboxyl groups bonded to an isolated or fused benzene ring. If more than one aromatic ring is present, they are linked together by a chemical bond or a divalent radical such as —O—, —$SO_2$—, or —CO—. Suitable aromatic dicarboxylic acids are, for example, terephthalic acid, isophthtalic acid, phthalic acid, naphthalenedicarboxylic acid, 4,4'-dicarboxybiphenyl, bis(p-carboxyphenyl) ether, bis(p-carboxyphenyl) sulfone, bis(p-carboxyphenyl) ketone, and mixtures thereof. Particularly preferred esters are the lower dialkyl esters of naphthalenedicarboxylic, isophthalic, and terephthalic acid, for example, dimethyl terephthalate or dimethyl-2,6-naphthalenedicarboxylate.

The aliphatic diols useful in this invention are alkanediols of from 2 to 10 carbon atoms, and having two, and preferably only two, primary alkyl alcohol functionalities. Examples of suitable diols are ethylene glycol, 2,2-dimethyl-1,3-propanediol, 1,4-butanediol and 1,4-cyclohexanedimethanol. The liquid mixture can also contain other alcohols such as trimethylolpropane, if desired.

The catalysts useful in this invention include those which would be suitable for use as transesterification catalysts. Zinc acetylacetonate and zinc acetate are examples of suitable catalysts. Other suitable catalysts include, for example, litharge, alkali metals and their hydrides, and certain compounds of certain metals such as, calcium, zinc, lanthanum, manganese, and cobalt, which are known in the art as being useful for catalyzing the ester-interchange reaction between, for example, ethylene glycol and dimethyl terephthalate.

The liquid mixture of this invention may further contain other suitable additives such as a polymer modifying additive, slip agents, cross-linkers, optical brighteners, uv stabilizers, etc.

The liquid mixture is preferably free-flowing. For the purposes of this specification, "free-flowing" means that the mixture will flow through the substantially horizontal channel without the need of pumps or other assistance. In particular, the acid or the ester and the diol should form a free-flowing mixture. As used herein, "liquid mixture" can contain solids, as long as the mixture is free-flowing. The acid or ester and the diol are preferably miscible at the conditions at which they are added to the channel. If the acid or ester and the diol are both miscible liquids, then they may be added to the channel separately or they may be premixed prior to adding to the channel. Sometimes it may be preferred to heat the various components in the liquid mixture prior to adding them to the channel. Sometimes such heating is beneficial in order to render the acid or ester and the diol miscible. This preheating is particularly useful when the diol and ester do not otherwise form a homogeneous mixture, for example when the ester is normally solid at room temperature. It may sometimes be difficult to obtain a free-flowing mixture with certain starting materials. For example, some dicarboxylic acid, such as terephthalic acid may be difficult to solubilize with diol, for example ethylene glycol. In such cases it may be beneficial to solubilize the acid in another component, for example some of the esterification product, prior to adding the acid to the channel.

The molar ratio of diol to ester added initially, not counting any recycled diol, to the channel is generally from 1.5:1 to 4:1, preferably from 1.8:1 to 2.2:1. The molar ratio of diol to acid added initially, not counting any recycled diol, to the channel is generally from 1.1:1 to 3:1, preferably from 1.1:1 to 1.5:1.

The channel is substantially horizontal, substantially flat, and of sufficient length to obtain at least %96 acid or ester conversion. Preferably, in operation, the liquid depth in the channel is less than 13 cm, more preferably less than 5 cm, most preferably less than 4 cm. Thin liquid depths help in heat transfer and in quick removal of byproduct vapors. Although referred to in the singular, the channel may be composed of a series of channels in communication with each other. For example, the channel used in the working examples, and illustrated in FIGS. 2–4, was composed of 3 separate channels, one on top of the other.

Heating may be accomplished by a variety of means. The heating should be sufficient to allow the reaction to occur but lower than a temperature which causes degradation of the acid or ester. Preferably the heating is as high as possible to promote a fast reaction rate. For example, heating from 180° C. to 250° C. is preferred. Generally heating will be accomplished by heating the bottom of the channel from below.

Preferably the heating is such that the temperature of the liquid mixture increases as it travels through the channel. This may be accomplished by increasing the heating to parts of the channel farther from the beginning. However, in the method of this invention, increasing temperatures in the liquid mixture may be achieved even without changes in the amount of heating to various parts of the channel. In the beginning of the channel there is more evaporation of water or alcohol byproducts than later in the channel. This evaporation cools the liquid mixture more in the early parts of the channel thus resulting in higher liquid temperatures in later parts of the channel.

Elevated pressure is useful for increasing reaction rates because elevated pressure allows for the use of higher temperatures. For example, higher pressure decreases the rate of evaporation of unreacted acid or ester and diol, thus allowing the reaction to proceed at higher temperatures without greatly increasing the amount of acid or ester and diol that are evaporated. Such elevated pressure can be achieved by conventional means. Preferably such increased pressure is supplied by the use of a non-oxidative gas such as pressurizing with nitrogen gas or other inert gas.

The water or alcohol byproduct formed during the reaction is evaporated together with some unreacted diol and some unreacted acid or ester. Generally, the heating is sufficient to produce some vapor bubbles and the rising vapor bubbles thus generated will cause a local mixing of the liquid mixture. The mixture of vapors separated from the liquid mixture is removed without significant further contact with the liquid mixture.

Preferably, the channel is housed within a vessel that allows elevated pressure to be maintained. The vessel also serves as a means for containing and capturing various materials that evaporate from the liquid mixture. Generally, the unreacted acid or ester is of sufficiently high boiling point that most of the unreacted acid or ester that evaporates from the liquid mixture, along with some of the water or alcohol byproduct and unreacted diol, condenses on the interior walls of the vessel, which are generally not heated. A benefit of the method of this invention is that self-cleaning of the interior walls of the vessel can be achieved due to the scrubbing effect of the droplets of condensed water or alcohol byproduct and unreacted diol which run down the interior walls of the vessel carrying with them unreacted acid or ester and other condensed materials. This condensate can then be collected at the bottom of the vessel and preferably recycled back into the channel. Because the unreacted acid or ester and diol which condense on the vessel walls can be recycled back into the reaction mixture, the method of this invention can be run at higher initial temperatures than methods which do not recapture evaporated unreacted acid or ester. This ability to run at higher initial temperatures helps to give the very fast reaction rates possible in the method of this invention.

In addition to the materials condensing on the vessel walls, much of the water or alcohol byproduct vapors and some of the unreacted diol vapors, rise to the top of the vessel housing the channel. These vapors can then be removed from the vessel and the unreacted diol can be separated from other materials in the vapor by known methods, for example, by fractionation. A portion, preferably most or all, of the separated diol can be returned to the channel at or near the beginning of the channel.

The method of this invention can further be illustrated by reference to the preferred embodiment illustrated in the figures. With reference to the figures, this embodiment of apparatus suitable for practicing the method of this invention includes a vessel 6 which contains the channel and which is capable of containing vapors produced during operation of the method of this invention and which is capable of maintaining elevated pressure. Such vessel can be constructed of any suitable material, for example, stainless steel.

The apparatus includes a means 1 for feeding or controlling the input of materials to a vessel 6. Materials that condense on and run down the interior walls of the vessel 6 can be collected at the bottom of the vessel 6 and returned, if desired, to the channel by a means 4 for collecting and transporting such condensed materials. The product mixture resulting from the method of this invention can be removed by a means 3 for withdrawing the product. Vapors that do not condense on the interior walls of the vessel 6 rise to the top of the vessel where they can exit the vessel via a means 7 for allowing such vapors to escape the vessel 6. Preferably, such means 7 is in communication with, and can transport vapors to, a means 5 for separating various components in the vapors, for example, separating unreacted diol from the water or alcohol byproduct. The separation means 5 can be any suitable means for separation, for example a distillation column. The apparatus also includes a means 2 for feeding collected and condensed vapors, for example unreacted diol, back to the channel. Each of such means 1, 2, 3, or 4 can be any suitable means such as pipe or gravity feed and may include pump or pressure assistance or a combination thereof if desired.

In operation, the liquid mixture of acid or ester, diol, and preferably catalyst in the case of transesterification, and other ingredients if any, are fed into the vessel 6 via means 1, for example a pipe. The liquid mixture flows onto the beginning of the channel which in this embodiment is composed of three trays on each of which there is a section of the channel which twists and turns across the tray. Recycled materials, for example unreacted diol and unreacted acid or ester, can also be added near the beginning of the channel via means 4, and 2, which are for example pipes. The reaction begins very soon, generating water or alcohol byproduct vapors. These water or alcohol vapors, along with some unreacted acid or ester, unreacted diol, and other miscellaneous reaction products, evaporate from the liquid mixture. Once the vapors are free of the liquid, some of the materials condense on the interior walls of the vessel 6 while other vapors move to the top of the vessel where they can be removed from the vessel via the means 7, for example a pipe, which directs the vapors to the separation means 5, for example a distillation column, for separation of the diol from the water or alcohol byproduct. The separated diol can then be recycled back to the channel via means 2. The material that has condensed on the interior wall of the vessel 6, forms droplets of unreacted diol, unreacted acid or ester, and other reaction products. These droplets flow down the wall of the vessel and dissolve deposits that may have formed on the walls. The droplets collect in the bottom the vessel and can be recycled back into the channel via means 4 and 2.

In the case of esterification of acids, it may be beneficial to dissolve the acid in some esterification reaction product prior to adding to the channel in order to obtain a free-flowing mixture. After the reaction is proceeding, this esterification product can come from means 3, if desired.

Figure 4:
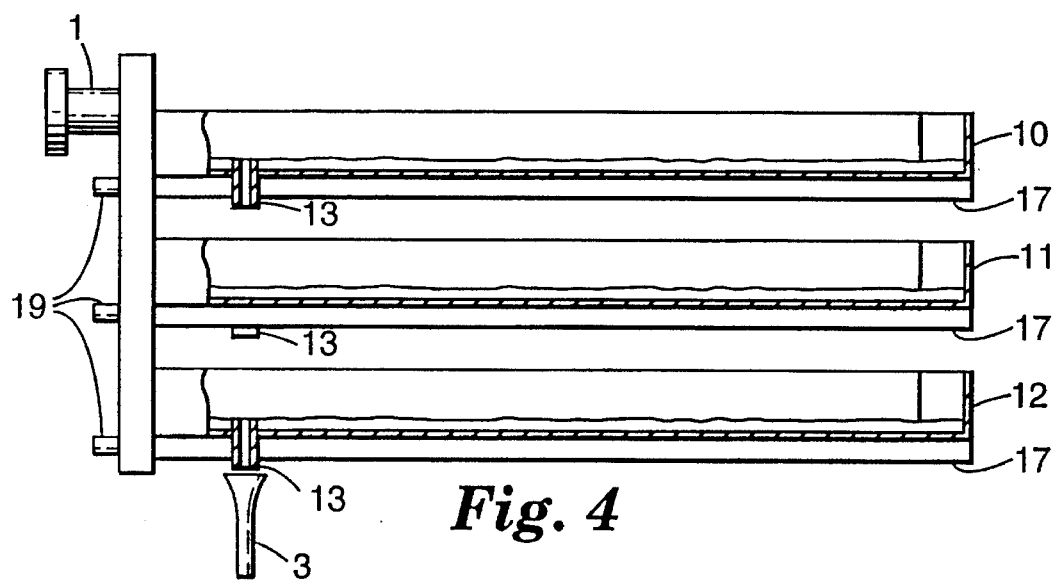
FIG. 4 shows a cross-sectional view of the channel of FIG. 2 with a cut-away showing the liquid in the channel.

The esterification and transesterification reactions are reversible, and if the byproduct water or alcohol is allowed significant contact with the liquid mixture solution, the reverse reaction will increase and thereby decrease the rate of the net forward reaction. As can be seen in FIG. 4, the vapors, including water or alcohol byproduct, for example methanol, are removed such that contact of the alcohol byproduct with the liquid mixture is minimized. As the vapors rise from the top tray they simply rise up away from the liquid mixture and do not contact the liquid mixture. As vapors rise from the bottom two trays, they contact the bottom of the tray above (i.e., the bottom of the heating jacket) and then move out into the vessel without contacting the liquid. This removal of water or alcohol byproduct with minimal further contact helps drive the reaction quickly to high completion.

The reaction continues as the mixture flows through the channel on the first tray 10 (tray A). At the end of the channel on tray A is a means 13 for controlling the depth of the liquid mixture, for example a height-adjustable weir. Generally the depth of the liquid mixture will be 0.3 to 0.35 cm deeper than the height of the weir. The liquid mixture flows over the means 13 and falls down to the second tray 11 (tray B). The liquid mixture continues to react and flows to the end of the channel on tray B where there is another means 13 for controlling the depth of the liquid mixture. The liquid mixture flows over the means 13 and down to the last tray 12 (tray C). At the end of the last tray the liquid flows over another means 13 for controlling the depth of the liquid mixture and falls down to means 3, for example, a funnel that catches the liquid mixture and a pipe for removal of the reaction product.

Figure 2:
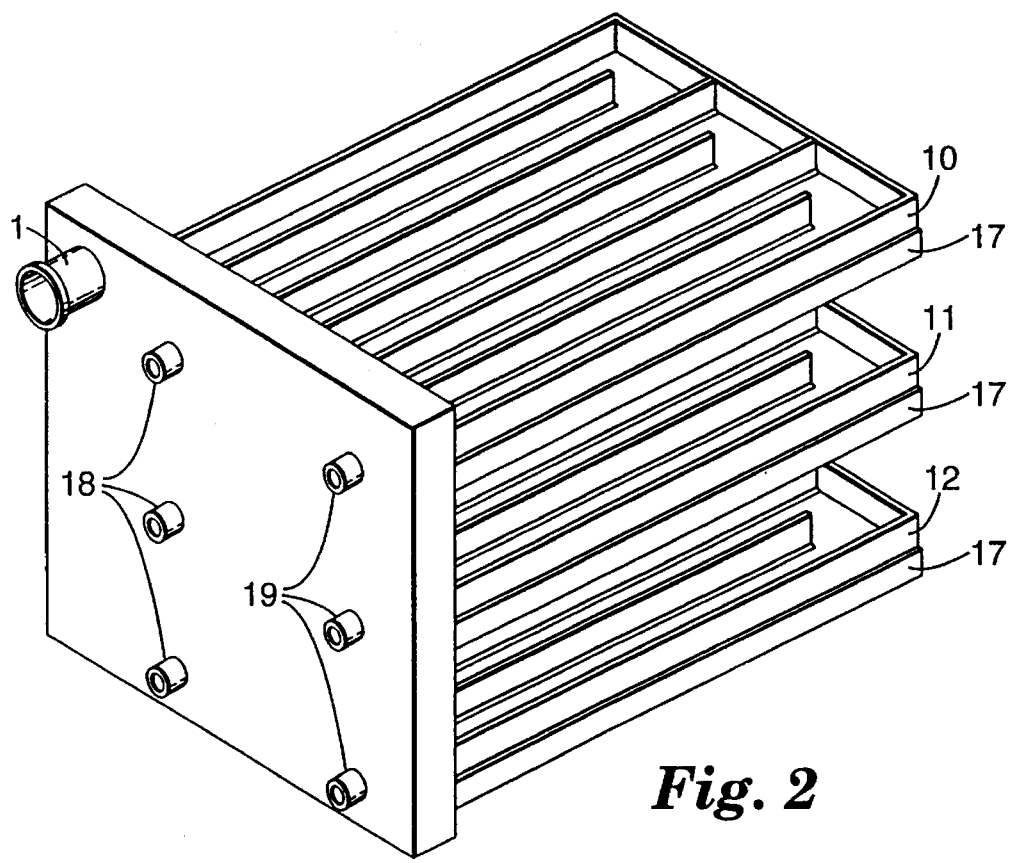
FIG. 2 shows a schematic representation of a first embodiment of a channel suitable for practicing the method of this invention.

Heat can be supplied to each of the trays by flow of a heated liquid, for example oil, through, for example, three individual jacket systems 17. The temperature and flow of the heating liquid for each tray jacket 17 can be controlled individually. The heated liquid can be supplied into either 18 or 19 and will return via the other (either 18 or 19) as illustrated in FIG. 2. Internal to the tray jackets 17 for the heating liquid, there can be baffles or channels to help ensure contact of the heating liquid over substantially all of the tray bottom. As the heated oil, or other suitable liquid, flows through the jacket for a particular tray, it cools as heat is transferred to the liquid reaction mixture. Preferably, the oil, or other suitable liquid, is supplied at a sufficiently high rate to minimize its temperature drop as it travels through the jacket. Most preferably, the temperature drop is no greater than 5° C. High flow rates of the heating medium generally also result in more turbulent flow which increases the uniformity of the temperature in the heating medium.

The method of this invention can be performed under increased pressure. The separation means, for example a distillation column is preferably also maintained at the vessel pressure. This increased pressure can be obtained by the introduction of a gas, preferably a non-oxidative gas such as nitrogen, into the vessel 6 via a gas inlet means 8. Elevated pressure can be maintained inside the vessel, for example, by using a combination of gas supply, for example nitrogen gas, and an automatic vent valve, for example in the exit 9 from the separation means 5, and a pressure seal, for example in means 3.

Due to the ratio of the width of the channel to the depth of the liquid and the speed of flow, a flow pattern can be achieved which is similar to the flow in an ideal flow tube. In other words, the flow is similar to the properties of a "plug flow", in which each molecule in the liquid mixture has the same dwell time in the channel.

In the method of this invention, fast reaction times are possible, in part because of the high ratio of diol to acid or ester that can be achieved internally by recycling of unreacted diol. This high ratio of diol to acid or ester helps drive the reaction in the desired direction even though the ratio of initially added diol to acid or ester (as provided in the initial feed stream) is closer to a conventional ratio e.g., about 1.8:1 for a continuous transesterification process, about 2.1:1 for a batch transesterification process, 1.1:1 for a continuous esterification process, or 1.4:1 for a batch esterification process.

The products of the method of this invention are useful, for example, for preparing polyesters. Such polyesters can be prepared, for example, by using convention polymerization means such as those cited in U.S. Pat. Nos. 4,339,570 (Muschelknautz et al.), 4,154,920 (Jabarin), 3,644,294 (Siclari et al.), and Swiss Patent Application 237,400.

EXAMPLES

In the following Examples, bis-hydroxyethylterephthalate was prepared by transesterification of dimethyl-terephthalate (DMT) with ethylene glycol (EG) using the method of this invention.

The degree of plug flow was shown by a colormetric test (Dye Test). A blue dye was added into the feed stream at feed pipe 1 and the. elapsed time until the colorant was visually detected in the product output at the exit 3 was recorded.

It is desirable to achieve high percent methyl ester conversion. Percent methyl ester conversion was determined by reverse phase high pressure liquid chromatography (HPLC).

If the reaction product will be used to make polyesters it is preferred to reduce the amount of undesirable side reactions. One undesirable side reaction occurs when diol, for example ethylene glycol, condenses with the desired transesterified product to produce terephthalate with one or two bound 1-hyroxyethylether ester groups (BDEG) instead of two hydroxyethyl ester groups. There may also be some condensation of ethylene glycol with itself to form diethylene glycol (DEG). The total amount of BDEG and DEG, or "total DEG" (TDEG), was measured by substantially complete product hydrolysis followed by gas chromatography (GC). Using the method of this invention, the total DEG in the product may be controlled to less than 0.8% by weight or even less than 0.4% by weight.

In the following Examples, the method of this invention was practiced using apparatus as shown in the figures. The apparatus used in the following Examples included a stainless steel vessel, various feed pipes. Tray A consisted of a folded path or channel through which the solution passed. The total channel consisted of three parallel trays, each similar in construction, positioned one above the other as shown in the Figures. The liquid reaction mixture flowed from tray A to tray B to tray C. The output from tray C was the finished product which left the vessel at the exit means 3. The overall dimensions of each tray were 76 cm (30 inches) long, 46 cm (18 inches wide) and with a sidewall height of 6.4 cm (2.5 inches). A weir to control the solution depth was positioned at the end of the folded path of each tray. The weir was a 2.54 cm diameter threaded pipe about 10 cm long. The threading provided a means to adjust the height of the weir. The solution escaping over the weir was directed to the tray below, or to the exit in the case of tray C. The jacket for the hot oil heating media covered the entire bottom of each tray and each tray could control to a separate temperature. Each jacket contained baffles to encourage uniform heating.

EXAMPLE 1

Figure 3:
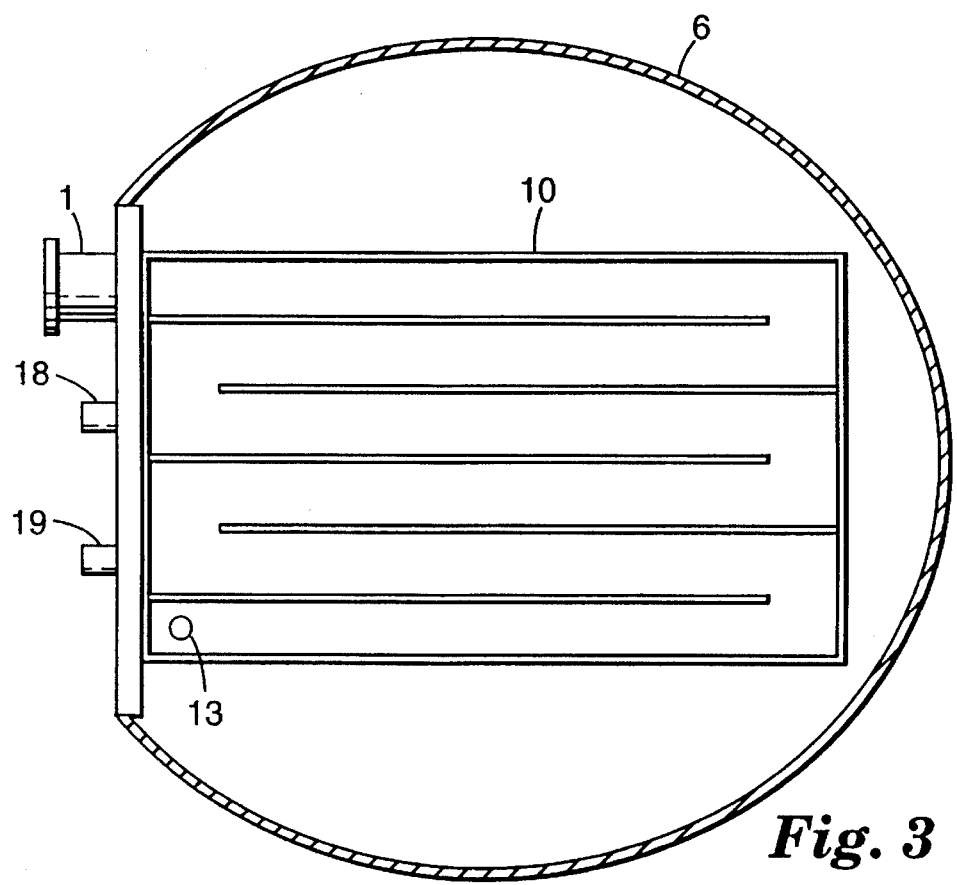
FIG. 3 shows a view of the channel of FIG. 2 as seen from above.

A solution was prepared by heating and stirring 159 kg of polymer grade dimethylterephthalate (DMT) (available from E I Du Pont Nemours, Inc.) and 93.7 kg polymer grade ethylene glycol (EG) (available from Texaco, Inc.) in a tank and the solution was heated to 177 C. A catalyst mixture was prepared containing 84.3 g of manganese acetate catalyst (available from Baker Chemical Co.) and 2.8 kg EG at room temperature. The two solutions were mixed to give a final solution containing 0.053% by weight of manganese acetate catalyst based on weight of DMT and the mixed solution was fed at 62.3 kg/hr (137 lb./hr) via a feed pipe (means 1) into the beginning of the channel at the inlet of tray A as shown in FIG. 3. This is a molar ratio of 1 mole of DMT to 1.9 moles of EG. The vessel containing the trays was operated at 15 psig (103.4 kPa) with hot oil temperatures for trays A, B, and C of 450° F. (232° C.), 450° F. (232° C.), and 460° F. (238° C.), respectively. Each of the three weirs were set to a height of 0.64 cm (0.25 inch) resulting in a liquid depth of 0.95 cm (⅜ inch). Vapors from the reaction were collected and evacuated through the top of the vessel at 7 and fed into the side of a distillation column 5 (as shown in FIG. 1). Condensation and separation of the components yielded methanol and ethylene glycol. The liquid ethylene glycol was returned to the beginning of the channel of tray A via inlet pipe 2. The resulting internal EG to DMT mole ratio was approximately 4 to 1 on tray A even though the EG to DMT ratio as fed to the channel via means 1 was 1.9 to 1. The temperatures in the liquid mixtures on trays A, B, and C were measured to be about 195° C. (383° F.), 199° C. (390° F.), and 209° C. (409° F.) respectively.

Product exiting the vessel at pipe 3 exhibited 98.1% DMT conversion and 86.2% methyl ester conversion as measured by reverse phase HPLC, and did not have any detectable free or bound diethylene glycol as determined by substantially complete product hydrolysis followed by GC testing. Colorimetric measurement (Dye test) of the product showed a mean dwell time of 17.5 minutes with dye being detected between 15 and 22 minutes. Byproduct vapor generated during the reactions was collected in a separate receiver. 11.05 kg/hr (24.3 lb./hr.) of material was collected consisting of 10.95 kg/hr (24.1 lb/hr) methanol and 0.09 kg/hr (0.2 lb/hr) EG.

EXAMPLE 2

A solution was prepared and fed to the channel as in Example 1. The vessel was operated at 29 psig with tray A, B, and C hot oil temperatures of about 299° C. (570° F.), 299° C. (570° F.), and 288° C. (550° F.). Liquid temperatures on trays A, B, and C were about 221° C. (429° F.), 238° C. (460° F.), and 257° C. (494° F.). Product exiting the vessel demonstrated DMT and methyl ester conversion of 99.9% and 98.5%, respectively and contained 0.58% by weight of free or bound diethylene glycol. The liquid dwell time was measured at minutes.

EXAMPLES 3–10

Examples 3–10 were prepared and analyzed as in Example 1 except with the EG to DMT molar ratios, the feed rates, the hot oil temperatures, the liquid mixture temperatures, the vessel pressure, and the weir heights as shown in Table 1. The DMT conversion, methyl ester conversion, residence time, and TDEG content are also summarized in Table 1.

TABLE 1

| Ex. | Tray A Oil | Tray A Liq. | Tray B Oil | Tray B Liq. | Tray C Oil | Tray C Liq. | Vessel Pressure MPa | Feed Rates (kg/hr) DMT | Feed Rates (kg/hr) EG | EG/DMT Mole Ratio | Weir Height cm | Residence Time (min.) | CONVERSION % DMT | CONVERSION % Methyl Ester | TDEG Content (wt. %) |
|---|---|---|---|---|---|---|---|---|---|---|---|---|---|---|---|
| 3 | 232 | 195 | 232 | 199 | 238 | 209 | .10 | 37.8 | 28.0 | 2.32 | .635 | 17.5 | 98.1 | 86.2 | 0 |
| 4 | 299 | 221 | 299 | 238 | 288 | 257 | .20 | 37.8 | 28.0 | 2.32 | .635 | 14 | 99.9 | 98.5 | 0.58 |
| 5 | 232 | 188 | 232 | 192 | 238 | 197 | .10 | 44.4 | 31.1 | 2.19 | 1.57 | 28.5 | 98.11 | 86.37 | 0 |
| 6 | 299 | 218 | 300 | 257 | 241 | 246 | .20 | 39.6 | 27.7 | 2.19 | 1.57 | 23 | 99.9 | 97.3 | 0.72 |
| 7 | 299 | 216 | 232 | 229 | 288 | 248 | .20 | 39.7 | 27.8 | 2.19 | 1.57 | 23.5 | 99.9 | 96.9 | 0.4 |
| 8 | 266 | 207 | 266 | 215 | 263 | 228 | .15 | 50.2 | 35.0 | 2.18 | 1.12 | 16 | 99.5 | 93.2 | 0 |
| 9 | 299 | 207 | 297 | 242 | 288 | 259 | .10 | 71.4 | 49.5 | 108.9 | 2.17 | 9 | 98.5 | 88.1 | 0.05 |
| 10 | 293 | 214 | 288 | 229 | 293 | 250 | .15 | 45.4 | 30.7 | 67.5 | 2.11 | 30 | 99.9 | 99.4 | — |

As shown in Table 1, the % ester conversion may be improved by raising the reactor pressure and product temperature, raising the liquid temperature, or increasing the liquid depth by raising the weir height. The residence time needed for high methyl ester conversion may be reduced by increasing the reactor pressure, raising the oil temperature, increasing the diol to ester ratio, or reducing the feed rate. TDEG content is decreased by lower diol to ester ratio and by lower temperatures.

EXAMPLE 11

In Example 11, a transesterification reaction was carried out as in Example 1 except the solutions of EG and DMT were fed to the reactor at 29.55 kg/hr (65 lb/hr) and 4.55 kg/hr (100 lb/hr) respectively. The EG to DMT molar ratio was 2.1:1. To the EG and DMT were added 24.1 g/hr (0.053% by weight based on weight of DMT) of manganese acetate transesterification catalyst and 15.9 g/hr (0.035% by weight based on weight of DMT) antimony trioxide polymerization catalyst. Trays A, B, and C were heated with hot oil of 284° C. (544° F.), 288° C. (550° F.), and 293° C. (560° F.) respectively. The resulting temperatures in the liquid mixture on trays A, B, and C were 212° C. (413° F.), 229° C. (444° F.), and 249° C. (480° F.) respectively. Vessel pressure was maintained at 152 kPa (22 psig). Weir height was 2.54 cm (1 inch) to give a liquid depth of 2.85 cm (1.12 inches). Product exiting the vessel exhibited 99.8% DMT conversion and 99.2% methyl ester conversion.

The product mixture exiting the vessel flowed through a pipe to the first of two flash evaporators. The first flash evaporator was operated at 150 mm Hg vacuum and was maintained at 260° C. (500° F.) with hot oil heat transfer fluid. Unreacted diol was evaporated from the liquid mixture and removed from the flash evaporator as the liquid entered the flash chamber. The liquid temperature dropped to 241° C. (466° F.) as it entered the flash evaporator but increased as it passed through the flash reactor to 251° C. (483° F.) at the exit.

The mixture flowed on to the second flash evaporator which was operated at 35 mm Hg vacuum. Unreacted diol and diol produced from the polymerization reaction was evaporated from the liquid mixture and removed from the flash evaporator. Hot oil transfer fluid maintained the reactor at 271° C. (520° F.) and the liquid temperature increased from 255° C. (491° F.) at the entrance of the flash evaporator to 264° C. (507° F.) at the exit.

The mixture exiting the second flash evaporator flowed to the first of two horizontal, agitated, thin-film evaporators (available from Artison Industries, Inc.) for additional polymerization. The first operated with 1.4 mm Hg vacuum, hot oil heat transfer fluid of 293° C. (560° F.), and a mixture discharge temperature of 281° C. (537° F.). The second operated with 0.4 mm Hg vacuum, hot oil heat transfer fluid of 282° C. (540° F.), and a mixture discharge temperature of 299° C. (570° F.). In both reactors, diol generated from the polymerization reactions was evaporated from the liquid and removed from the reactors. The total residence time in the system from feeding the transesterification reactor to final exit from the last polymerizer was approximately 50 minutes.

Polyethylene terephthalate produced under these condition was measured to have a 0.59 intrinsic viscosity, a melt point of 260° C. as measured by Mettler optical measurement, and a yellowness index of less than 1.0.

Various modifications and alterations of this invention will become apparent to those skilled in the art without departing from the scope and spirit of this invention.

What is claimed is:

1. A process for the esterification of dicarboxylic acids or for the transesterification of dicarboxylic lower-alkyl esters, with at least one alkylene diol having two primary alcohol functionalities, comprising the steps of A) adding a liquid mixture comprising said acid or ester and said diol to a substantially horizontal channel;

B) allowing said liquid to flow through said channel such that the ratio of the width of said channel to the depth of said liquid is greater than 1.5 to 1;

C) heating said liquid mixture to a temperature sufficiently high to initiate esterification or transesterification and to drive off reaction water or lower alkyl alcohol byproducts;

D) removing water or lower-alkyl alcohol byproduct vapors from the channel such that such vapors have little further contact with said liquid mixture.

2. The process of claim 1 further comprising the steps of

E) collecting unreacted diol which has evaporated from the liquid mixture; and

F) returning said collected diol to said channel at, or near to, the beginning of said channel.

3. The process of claim 2 wherein said collected diol is returned to said channel within the first 5% of the total length of said channel.

4. The process of claim 1 wherein said liquid mixture further comprises a catalyst that promotes or accelerates transesterification.

5. The process of claim 1 wherein said channel is a series of channels in communication.

6. The process of claim 1 wherein the liquid depth in the channel is less than 5 cm.

7. The process of claim 1 wherein heating is to a temperature sufficiently high to drive off reaction byproducts at a sufficient rate that the net forward reaction is not significantly reduced.

8. The process of claim 1 wherein said heating is such that the temperature in said liquid mixture increases as said liquid passes through said channel.

9. The process of claim 1 wherein said channel is housed in a vessel that allows the reaction to occur at elevated pressure.

10. The process of claim 9 wherein said process is carried out at elevated pressures.

11. The process of claim 1 further comprising the steps of collecting unreacted acid or ester which has evaporated from the liquid mixture; and returning said collected acid or ester to said channel at, or near to, the beginning of said channel.

12. The process of claim 1 wherein said process is continuous.

13. The process of claim 1 wherein the ratio of the width of said channel to the depth of said liquid and the speed of flow are such that the residence time of the components of said liquid mixture is relatively uniform.

14. The process of claim 1 wherein at least 96% of the acid groups of said acid or 96% of the ester groups of said ester are esterified or transesterified in 30 minutes or less.

15. The process of claim 1 wherein said acid is terephthalic acid or 2,6-naphthalenedicarboxylic acid, said ester is dimethyl terephthalate or dimethyl-2,6-naphthalenedicarboxylate, and said diol is ethylene glycol, 2,2-dimethyl-1,3-propanediol, 1,4-butanediol, or 1,4-cyclohexanedimethanol.

16. The process of claim 1 wherein the molar ratio of said diol to said ester added to the channel in step (A) is from 1.8:1 to 2.2:1.

17. The process of claim 1 wherein the molar ratio of said diol to said acid added to the channel in step (A) is from 1.1:1 to 1.5:1.

18. The process of claim 1 further comprising the step of polymerizing the resulting esterification or transesterification product to produce polyesters or copolyesters.

19. The process of claim 18 wherein said polymerizing comprises flash evaporation.

20. The process of claim 18 wherein said polymerizing comprises thin film polymerization.

\* \* \* \* \*

UNITED STATES PATENT AND TRADEMARK OFFICE
CERTIFICATE OF CORRECTION

PATENT NO. : 5,476,919
DATED : December 19, 1995
INVENTOR(S) : Mark N. Schaeffer It is certified that error appears in the above-indentified patent and that said Letters Patent is hereby corrected as shown below:

Col. 6, Line 30, "or." should read -- or --

Col. 7, Line 20, "the." should read -- the --

Col. 8, Line 54, "at" should read -- at 14 --

Col. 3, Line 48, "%96" should read -- 96% --

Col. 5, Line 52, "bottom the" should read -- bottom of the --

Signed and Sealed this

Seventh Day of July, 1998

Attest:

BRUCE LEHMAN

*Attesting Officer*  *Commissioner of Patents and Trademarks*